Patented Jan. 26, 1932

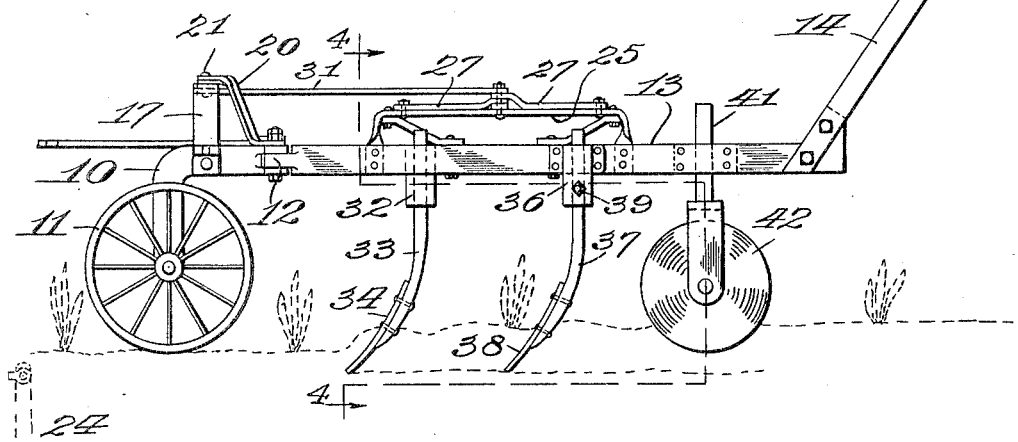
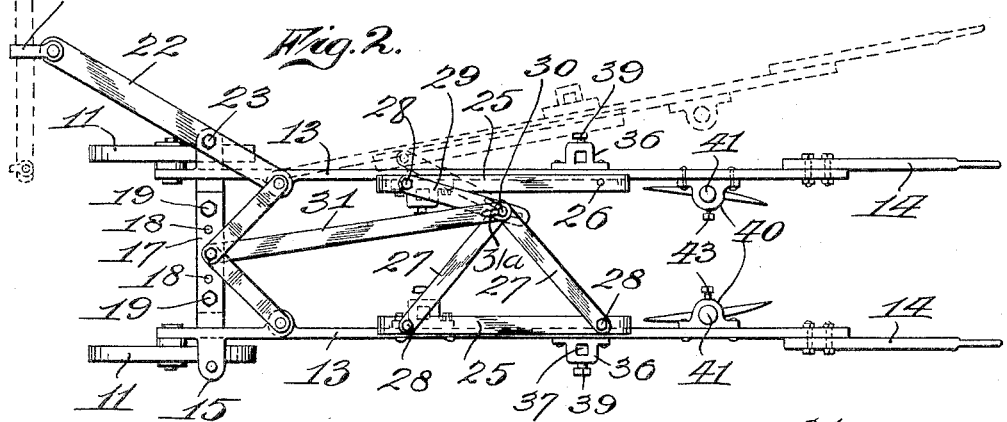
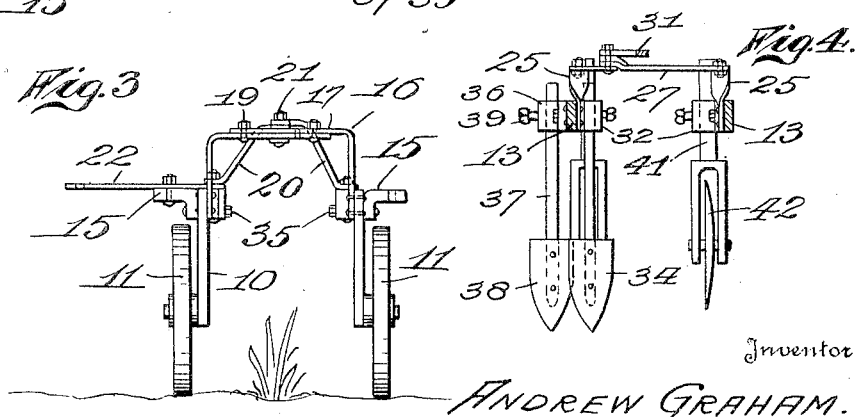

1,842,667

UNITED STATES PATENT OFFICE

ANDREW GRAHAM, OF GLENDALE, CALIFORNIA

CULTIVATOR

Application filed June 19, 1929. Serial No. 372,079.

My invention relates to a cultivator that is especially designed for cultivating a single row of corn or other vegetable growth that is planted in rows and which requires periodical cultivation, and the principal objects of my invention are, to generally improve upon and simplify the construction of the existing forms of single row cultivators, further, to provide a cultivator that is relatively simple in construction, inexpensive of manufacture, capable of being readily manipulated while in use, and further, to provide a cultivator that is attached to be drawn by a single draft animal.

Further objects of my invention are, to provide a cultivator of the character referred to that is equipped with readily adjustable shovels and disk colters, further to mount the plow and colter carrying beams so that they may be readily swung laterally during forward movement of the cultivator, further, to provide connections between the beams whereby the same may be adjusted toward or away from each other so as to vary the space between the shovels and disk colters, and further, to provide draft connections for the cultivator whereby the same will be drawn directly forward by the draft animal that traverses the space immediately to the right or left of the row of corn or other vegetable growth that is being cultivated.

With the foregoing and other objects in view, my invention consists in certain novel features of construction and arrangement of parts that will hereinafter be more fully described and claimed and illustrated in the accompanying drawings, in which:

Fig. 1 is a side elevational view of a cultivator embodying the principles of my invention.

Fig. 2 is a plan view of the cultivator.

Fig. 3 is a front elevational view of the cultivator.

Fig. 4 is a cross section taken on the line 4—4 of Fig. 1.

Referring by numerals to the accompanying drawings which illustrate a practical embodiment of my invention, 10, 10 designate right angle frames and journaled on the lower end of the vertical leg of each frame is a small wheel 11.

Connected by a suitable hinge 12, having a vertical axis to the rear end of the horizontal leg of each frame 10 is a forward end of a beam 13 and secured to the rear end of each beam is the lower end of an upwardly and rearwardly projecting handlebar 14.

Secured to and projecting outwardly from the horizontal leg of each frame 10 is a short horizontally disposed bracket 15 that is perforated for the reception of a bolt or pin.

Secured to the horizontal legs of the frames 10 are the lower ends of front arch members 16 that are provided with horizontally disposed portions 17, one of which overlies the other, and formed in the overlapping portions of these arch members are apertures 18 that are adapted to receive bolts 19 and which latter rigidly secure the arch members to each other.

By providing a plurality of apertures 18, the arch members and the frames 10, to which said arch members are connected, may be adjusted so as to vary the width between the frames 10 and the bolts 19, provide means for rigidly securing the arch members in their differently adjusted positions.

The forward upper ends of braces 20 are secured by means of a pin or bolt 21 to the central portion of the arch formed by members 16 and the lower rear ends of these braces are secured to the rear ends of the horizontal arms of the frames 10, and preferably to the pins or bolts that form the horizontal axes for the hinges 12.

A drawbar 22 has its rear end connected to one of the hinges 12 by the pin or bolt that serves as an axis for said hinge, and this intermediate portion of this drawbar is connected by a pin or bolt 23 to the adjacent one of the brackets 15. The forward end of the drawbar, which occupies an angular position relative to the planes occupied by the parallel beams 13 is provided with a hook or clevis 24 to which may be connected a singletree.

Secured to the intermediate portion of each beam 13 are the lower ends of the short depending end portions of arches 25 that occupy a horizontal plane a short distance above the plane occupied by the beams 13, and formed in the ends of the horizontal portions of these arches are apertures such as 26 that are adapted to receive pins or bolts.

A pair of links 27 are pivotally connected by means of pins or bolts 28 to the end portions of one of the arches 25 and the opposite or inner ends of said links 27 are pivotally connected to each other and to the rear end of a link 29 by a pin or bolt 30 that passes through apertures in said links and through a short longitudinally disposed slot in said link 29. The forward end of link 31 is pivotally connected to pin or bolt 21 that connects the forward ends of the braces 20 to the central portion of the arch members 16 and the rear end of this link 31 is provided with a short longitudinally disposed slot 31ª, through which passes the pin or bolt 30.

The links 27 and 29 function as a flexible transverse connection between the arches 25 and they also serve as a point of connection for the rear end of the draft link 31.

Secured to the inner faces of the beams 13, adjacent to the forward ends of the arches 25, are vertically disposed sockets 32 that receive the upper ends of shanks 33 and the lower ends of which carry ordinary cultivator shovels 34. The shanks 33 are locked in their sockets by means of set screws 35.

Arranged on the outer faces of the beams 13, adjacent to the rear ends of the arches 25, are sockets 36 that receive the upper portions of shanks 37, the lower ends of which shanks carry cultivator shovels 38, and said shanks are locked to their sockets by means of said screws 39.

Secured on the inner faces of the rear portions of the beams 13 are sockets 40 that receive shanks 41 and journaled on the lower end of each shank is a disk colter 42. The colter carrying shanks 41 are locked to the sockets 40 in differently adjusted positions by means of set screws 43. During operation of my improved cultivator, the same is drawn forwardly by means of a draft animal attached to the singletree that is connected to the forward end of drawbar 22 and an operator engaging the handlebars 14 guides the cultivator as it passes along the row of corn or other vegetable growth that is being cultivated.

The wheels 11 support the forward portion of the cultivator and these wheels travel along the sides of the row that is being cultivated and the shovels 34 and 38 enter the ground so as to plow through and break up and pulverize that portion of the ground immediately adjacent to the hills of corn or other vegetable growth and the disk colters 42, which travel immediately to the rear of the shovels, turn the loose earth inward toward the hills of corn or other growth, or outwardly away from the same, depending upon the vegetation that is being cultivated.

During the forward travel of the cultivator, either shovel carrying beam may be swung laterally in either direction, as illustrated by dotted lines in Fig. 2, and thus the shovels may be positioned so as to traverse paths that are immediately adjacent to or spaced apart from the row of corn or other growth that is under cultivation.

The width of the cultivator may be readily adjusted by setting the bolts 19 in different apertures 18 in the overlapping portions of the front arch and the shanks that carry the cultivator shovels may be readily adjusted into different vertical positions and secured to the sockets 32 and 36 by tightening the set screws 35 and 39.

Likewise the disk colter carrying shanks 41 may be adjusted vertically and locked at different elevations by tightening the set screws 43 and where the cultivator is being drawn to or from the field that is being cultivated, the colter disks may be lowered so as to act as traction wheels and when thus used the rear portion of the cultivator is elevated so that the shovels do not enter the ground.

A cultivator of my improved construction may be used on drilled or check row planted corn or other vegetable growth and is effective in saving much time and labor incident to cultivating operations.

The cultivator is relatively simple in construction, inexpensive of manufacture, requires but a single draft animal for its operation, and is very effective in performing the functions for which it is intended.

It will be understood that minor changes in the size, form and construction of the various parts of my improved cultivator may be made and substituted for those herein shown and described without departing from the spirit of my invention, the scope of which is set forth in the appended claims.

I claim as my invention:

1. In a cultivator, a pair of connected wheel supported frames, beams hinged to said frames for lateral swinging movement, an upwardly projecting arch arranged in parallelism with and adjacent the intermediate portion of each beam, links having their outer ends pivotally connected to said arches, the inner ends of said links having a sliding pivotal connection, a draft link pivotally connected to the connected inner ends of said links, the forward end of which draft link is connected to the wheel supported frames, cultivator shovels adjustably mounted on said beams, and disc colters adjustably mounted on said beams to the rear of said shovels.

2. In a cultivator, a pair of connected wheel supported frames, beams hinged to the rear portions of said frames for lateral swinging movement, an upwardly projecting arch arranged in parallelism with and adjacent the intermediate portion of each beam, a pair of links pivotally connected to the end portions of one of said arches and projecting toward the opposite arch, a link pivotally connected to the forward portion of the opposite arch and extending rearwardly to the inner ends of the pair of links, the rear portion of said rearwardly extending link being provided with a longitudinally disposed slot, a draft link pivotally connected to the connected wheel supported frames, a pin pivotally connecting the rear end of said draft link the inner ends of said pair of links and the slotted rear end of the rearwardly projecting link, cultivator shovels adjustably arranged on the intermediate portions of said beams, and disc colters adjustably mounted on the rear portions of said beams.

In testimony whereof I affix my signature.

ANDREW GRAHAM.